United States Patent
Whytock et al.

(10) Patent No.: US 12,039,395 B2
(45) Date of Patent: Jul. 16, 2024

(54) METHOD FOR DETECTING MOUNTING OF AN OBJECT AT A TERMINAL DEVICE

(71) Applicant: NCR Corporation, Atlanta, GA (US)

(72) Inventors: Alexander William Whytock, Blairgowrie (GB); Rajveer Singh, Kirkcaldy (GB); Gregory Brookes, Glasgow (GB)

(73) Assignee: NCR Alleos Corporation, Atlanta, GA (US)

( * ) Notice: Subject to any disclaimer, the term of this patent is extended or adjusted under 35 U.S.C. 154(b) by 54 days.

(21) Appl. No.: 17/866,789

(22) Filed: Jul. 18, 2022

(65) Prior Publication Data

US 2024/0020492 A1 Jan. 18, 2024

(51) Int. Cl.
G06K 7/00 (2006.01)
G06N 3/045 (2023.01)

(52) U.S. Cl.
CPC ......... G06K 7/0021 (2013.01); G06K 7/0091 (2013.01); G06N 3/045 (2023.01)

(58) Field of Classification Search
CPC .... G06K 7/0021; G06K 7/0091; G07F 19/20; G06N 3/045
USPC ............... 235/379, 375; 705/35–45
See application file for complete search history.

(56) References Cited

U.S. PATENT DOCUMENTS

2017/0061167 A1* 3/2017 McNicoll ........... G06K 13/0875
2018/0218580 A1* 8/2018 Pantus ................ G01M 5/0091
2019/0245851 A1* 8/2019 Whaley .................. G06V 40/25
2019/0297196 A1* 9/2019 Kaneko .............. H04N 1/00209
2020/0134342 A1* 4/2020 Parupati ............... G06V 10/811
2020/0134985 A1 4/2020 Fujimoto et al.
(Continued)

FOREIGN PATENT DOCUMENTS

JP 10307186 11/1998
JP 2010243231 10/2010
(Continued)

OTHER PUBLICATIONS

Minster John: "Guest Article: ATM Skimming Solutions Deployed By Financial Institution—Convergint", Mar. 19, 2018 (Mar. 19, 2018), pp. 1-7, XP093057117, Retrieved from the Internet: URL:https://www.convergint.com/guest-artic le-atm-skimming-solutions-deployed-by-financial institution/ [retrieved on Jun. 23, 2023].
(Continued)

*Primary Examiner* — Edwyn Labaze
(74) *Attorney, Agent, or Firm* — Notaro, Michalos & Zaccaria P.C.; John S. Economou

(57) ABSTRACT

A system for detecting mounting of a card skimmer at an automated teller machine receives detection data from sensors. The system converts the detection data from the time domain to the frequency domain using a wavelet transform to generate a wavelet matrix of coefficients. The system includes a convolutional neural network model to identify features in the wavelet matrix. The system generates a rain alert signal based on the identified features. The system includes a long short-term memory recurrent neural network model to determine a sequence of (i) an idle state, (ii) a hand approach state, and (iii) a card skimmer mounting state based on the detection data. The system generates a tamper alert signal based on the sequence determination.

20 Claims, 15 Drawing Sheets

(56) References Cited

U.S. PATENT DOCUMENTS

| | | |
|---|---|---|
| 2020/0387679 A1 | 12/2020 | Miyazawa |
| 2022/0036133 A1 | 2/2022 | Wigglesworth et al. |
| 2022/0188598 A1* | 6/2022 | Gu .................... G06N 3/044 |
| 2022/0308568 A1* | 9/2022 | Oh ................. G05B 23/0221 |

FOREIGN PATENT DOCUMENTS

| | | |
|---|---|---|
| JP | 2014-182643 | 9/2014 |
| JP | 2016110415 | 6/2016 |
| JP | 2020-067973 | 4/2020 |
| JP | 2020-201692 A | 12/2020 |

OTHER PUBLICATIONS

Japanese Patent Office—Examination Report with translation, dated Dec. 4, 2023.
JP 2008-225670A [Online] Guest Article: ATMSkimming Solutions DeployedBy Financial Institution, Mar. 19, 2018, the column of "Solutions", https://www.convergint.com/guest-article-atm-skimming-solutions-deployed-by-financial-institution/, Mar. 7, 2024.
Translation of Office Action for corresponding Japanese Patent Appl. No. 2022-211151 dated Mar. 11, 2024.

* cited by examiner

```
for ii in range(0,X_train.shape[0]):
    if ii % 1000 == 0:
        print(ii)
    for jj in range(0,3):
        signal = X_train[ii,jj]
        coeff, freq = pywt.cwt(signal, scales, waveletname)
        coeff_ = coeff[:,:width]
        train_data_cwt[ii, :, :, jj] = coeff_
```

Feature
[1, 1, 1, 1, 1, 1, 1, 1, 4, 5, 4, 1, 1, 1]
[0 0 0 0 0 0 0 0 1, 1, 1, 0, 0, 0]

FIG. 10D

METHOD FOR DETECTING MOUNTING OF AN OBJECT AT A TERMINAL DEVICE

FIELD

This invention relates to a computer-implemented method, a data processing system, and a computer program product for detecting mounting of an object, such as a card skimmer, at a terminal device, such as an automated teller machine (ATM).

BACKGROUND

It is known to attempt to detect a card skimmer placed by a thief on a fascia of an ATM. If such a card skimmer is mounted to the ATM, this may enable the thief to steal a customer's card information. However known approaches to detect card skimmers suffer from the problem of low accuracy results with frequent false positive alerts being generated.

There is therefore a need for a more accurate system for detecting mounting of an object at a terminal device.

SUMMARY

It is an aim of the present invention to at least partly mitigate one or more of the above-mentioned problems.

It is an aim of certain embodiments of the present invention to provide a system for more accurately detecting mounting of an object, such as a card skimmer, at a terminal device, such as the fascia of an ATM. It is an aim of certain embodiments of the present invention to address the problem of false positive skimmer alerts, for example in the event of the ATM being exposed to rain which may cause technical problems with a capacitive sensor signal.

It is an aim of certain embodiments of the present invention to enable faster data processing and data formatting after the raw data has been obtained.

According to the invention there is provided a computer-implemented method for detecting mounting of an object at a terminal device, the method comprising the steps of:

receiving detection data from one or more sensors, generating a wavelet matrix based on the detection data, and generating an ambient environment alert based on the wavelet matrix.

The ambient environment alert may comprise an ambient weather alert. The ambient weather alert may comprise a rain alert. By generating the rain alert signal, the invention reduces the incidence of false positive card skimmer alerts being generated in the event that the ATM only encounters rain without any attempt to mount a card skimmer device. In particular the invention addresses the technical problem of false positive card skimmer alerts when exposure of the ATM to rain causes technical problems with signals from capacitive sensors. The invention thus may achieve high accuracy card skimmer alerts and minimize false positive card skimmer alerts being generated when it is only raining. By reducing false positive card skimmer alerts, the invention achieves enhanced reliability and reduces unnecessary maintenance visits by a technical specialist. The ATM may thus remain functioning correctly and customer transactions may remain unaffected.

The ambient weather alert may comprise a different type of weather alert for detecting other types of weather conditions around the ATM instead of rain, and is not limited to being a rain alert only. For example the ambient weather alert may be a wind alert or a cold weather alert or a hot weather alert. Wind or cold weather or hot weather may cause false positive readings from the sensors. In particular rapid temperature changes may produce mechanical expansion or contraction of the fascia or the brackets of the ATM that may cause false positive readings. This may indicate incorrectly built or incorrectly fitted hardware.

The wavelet matrix retains localized time data for more accurate rain alert signal generation. The detection data received from the sensors is time series data. If there is an alert generated during a certain period of time, it is easier to know when this was if the localized time information is not lost. It also allows for running the model on data retrieved from ATMs without the AI capability to identify in which time periods it may have been raining. This is especially so if it is suspected there may be false positive card skimmer alerts present within the data logs.

The detection data may be converted from the time domain to the frequency domain using a wavelet transform to generate the wavelet matrix. The wavelet transform may be a continuous wavelet transform or may be a discrete wavelet transform. The wavelet transform may include passing the detection data through a high pass filter and a low pass filter. Rain creates high frequency signals, and thus other signals such as noise may be ignored.

The method may comprise the step of identifying one or more features in the wavelet matrix, the ambient environment alert being generated based on the one or more identified features. The identified feature may be an increase in real rain noise. This noise may be a higher frequency but lower amplitude signal compared to the idle signal data. Over a period of several hours the buildup of moisture on the card reader, especially in cases where the ATM bezel design may lead to pooling of some water, may cause a change in amplitude of the signal. By focusing on the frequency change, the invention enables the other changes in signal data to be ignored. The one or more features may be identified using a first machine learning model. The first machine learning model provides a highly accurate and highly efficient means of identifying the features. The first machine learning model may comprise a convolutional neural network model. The convolutional neural network model may be updated over time as new training data becomes available. If an upgrade or improvement to the convolutional neural network model becomes available, the invention may be quickly updated based on a software update without requiring technically complex and time-consuming hardware modifications.

The method may comprise the step of determining based on the detection data a sequence of (i) an idle state during a first time period, (ii) an approach state during a second time period, and (iii) an object mounting state during a third time period. The second time period may be subsequent to the first time period. The third time period may be subsequent to the second time period. The method may comprise the step of generating a tamper alert based on the sequence determination. By determining the sequence and then generating the tamper alert signal based on this sequence, this enables more accurate detection of mounting of a card skimmer to an ATM. By only generating the tamper alert signal when this sequence has been identified, the invention reduces the incidence of false positive card skimmer alerts being generated. The enhanced detection leads to improved customer confidence in the operation of the ATM. A reduction in false positive card skimmer alerts results in less time-consuming technical maintenance of the ATM being required by a technical specialist.

The detection data may have a substantially constant amplitude at a first level during the first time period. The detection data may have a negative peak amplitude during the second time period, the negative peak being substantially lower than the first level. The detection data may have a substantially constant amplitude at a third level during the third time period, the third level being substantially higher than the first level.

In another embodiment the detection data may have a short period, for example a few seconds, of very high and low peaks during the second time period. The short period of very high and low peaks occurs as the card skimmer is being mounted to the ATM.

The sequence may be determined using a second machine learning model. The second machine learning model provides a highly accurate and highly efficient means of identifying the sequence. The second machine learning model may comprise a deep learning model. The deep learning model may comprise a long short-term memory recurrent neural network model. The long short-term memory recurrent neural network model is highly effective at filtering out noise in the signal. The long short-term memory recurrent neural network model may be updated over time if new training data on a new card skimmer attack becomes available. If an upgrade or improvement to the long short-term memory recurrent neural network model becomes available, the invention may be updated based on a software update without requiring technically complex and time-consuming hardware modifications.

The second machine learning model may comprise a support vector machine.

The second machine learning model may comprise a 1-D convolutional neural network model. The 1-D convolutional neural network model may identify one or more distinguishing features in the detection data, instead of determining the sequence. The 1-D convolutional neural network model may be especially accurate when analyzing 1-D data, such as time-series data from an ATM.

The terminal device may comprise an automated teller machine device. The method may be configured to detect mounting of an object at a bezel of the automated teller machine device. The object may comprise a card skimmer device.

At least one of the one or more sensors may comprise a capacitive-based sensor. At least one of the one or more sensors may comprise a mmWave Radar. At least one of the one or more sensors may comprise a time of flight sensor. The capacitive-based sensor may be mounted adjacent to a magnetic card reader device, the capacitive-based sensor may be configured to generate the detection data upon the object being placed adjacent to an exterior portion of the bezel.

The method may comprise the steps of:
generating a set of training data, and
training at least one of the first machine learning model and the second machine learning model based on the set of training data.

By automatically generating the set of training data, the invention enables the otherwise time-consuming and repetitive manual process of data extraction and labelling of associated activities to be avoided. The invention thus results in a faster process of creating the training data from the large, raw data set. The cleaner training data results in the overall machine learning model accuracy being improved.

The set of training data may be generated by:
receiving a set of historical data, and identifying one or more features in the set of historical data, each of the one or more features representing an activity.

It is common to have very large sets of historical data. Manual analysis of such a large set of historical data by an engineer would be a hugely time-consuming task. The invention enables the automatic identification of the activities, such as a presence of a card skimmer at an ATM, a presence of a customer hand at the ATM, an idle status of the ATM, a transaction status of the ATM, different types of transactions based on information from other devices, such as replenishment when the fascia door is open, check processing, cash recycling, contactless card touches, screen touches for menu parsing. The invention also enables the automatic labelling of the activities accordingly. A cleaner training data set enables the overall machine learning model accuracy to be improved.

The one or more features may be identified by:
determining one or more peaks in the set of historical data, and
generating one or more sub-sets of data based on the one or more determined peaks.

Each sub-set of data includes padding data on either side of the peak. The padding data makes it easier to visualize the feature. The padding data may provide information of the context of the activity, such as an 'IDLE' state before or a'SKIMMER' state after, and the peak may provide information on a 'HAND ACTIVITY'.

The one or more peaks may be determined by applying a moving average and a standard deviation to the set of historical data. The set of training data may be generated by:
receiving a set of label data, and
augmenting the one or more identified features with the set of label data.

The label data may be automatically created based on transaction activity data from other devices, such as replenishment when the fascia door is open, cash taken, and the like.

The invention also provides in another aspect a data processing system for detecting mounting of an object at a terminal device, the system comprising a processor configured to:
receive detection data from one or more sensors,
generate a wavelet matrix based on the detection data, and
generate an ambient environment alert based on the wavelet matrix.

In a further aspect of the invention there is provided a computer program product comprising instructions capable of causing a computer system to perform a method of the invention when the computer program product is executed on the computer system. The computer program product may be embodied on a record medium, or a carrier signal, or a read-only memory.

BRIEF DESCRIPTION OF THE DRAWINGS

Embodiments of the present invention will now be described hereinafter, by way of example only, with reference to the accompanying drawings, in which:

FIG. 4 is an extract of instruction code of a wavelet transform of the method of FIG. 1;

FIG. 5 is a wavelet matrix of the method of FIG. 1;

FIG. 10D is an image illustrating features of the method of FIG. 9;

In the drawings like reference numerals refer to like parts.

DETAILED DESCRIPTION

Figure 1:
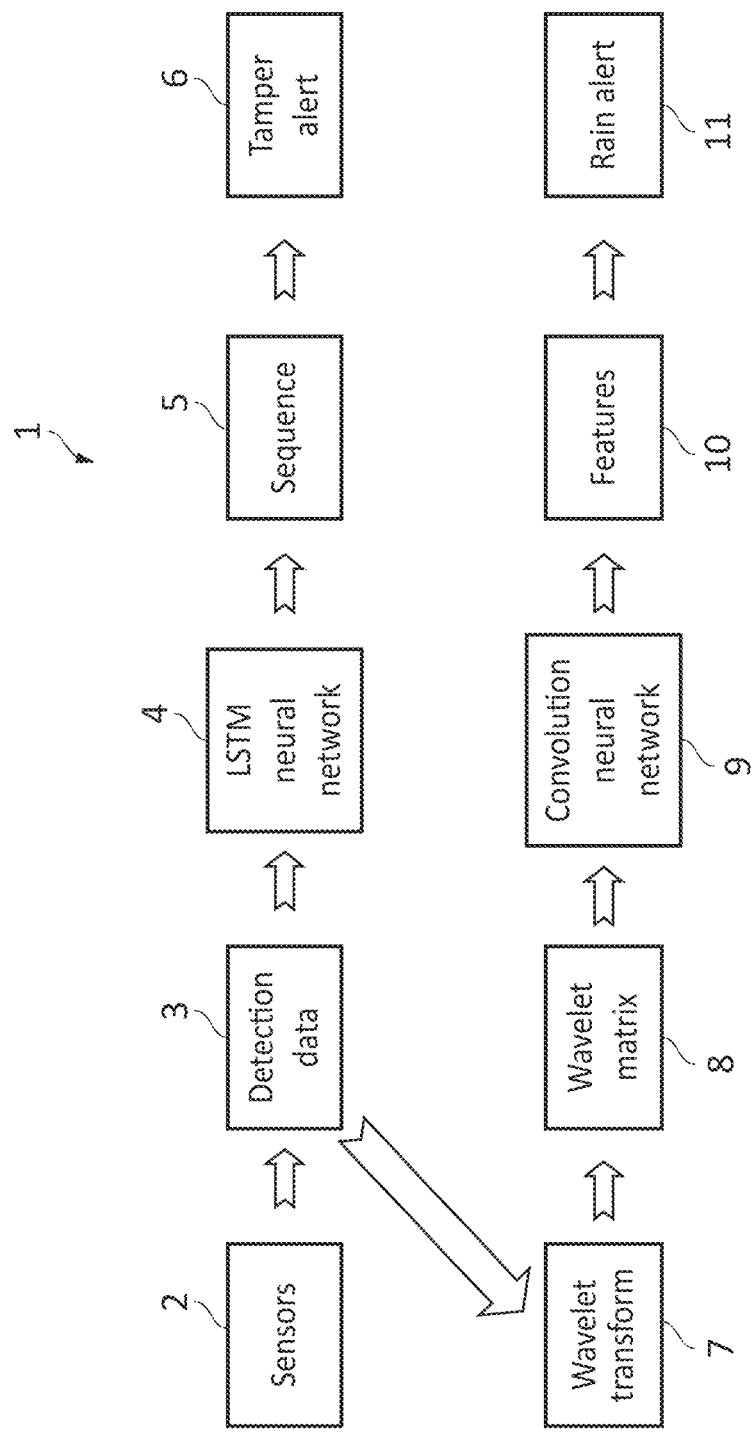
FIG. 1 is a flow diagram of a method according to the invention for detecting mounting of an object at a terminal device.

Referring to the drawings, and initially to FIGS. 1 to 8 thereof, there is illustrated a computer-implemented data processing system 1 according to the invention for detecting mounting of an object at a self-service terminal device. For example the system 1 may be employed to detect mounting of a card skimmer device at a bezel of an automated teller machine (ATM).

In one embodiment the system 1 may be provided in the form of a skimmer protection solution (SPS). The system 1 may detect the presence of a card skimmer device placed on the fascia of an ATM by criminals to attempt to steal credit card details by recording the magnetic stripe present on the card.

In one embodiment the system 1 may include a microcontroller to manage the functions of the system 1, to gather data from sensors/outputs to effectors used by the system 1, and to report to the ATM PC core, for example via a USB 2.0. The system 1 may perform the following functions:

detect unusual objects placed within the vicinity of the card reader entry/exit slot, report the presence of unusual objects placed within the vicinity of the card reader entry/exit slot, report faults that disable or inhibit the function of detecting unusual objects, electromagnetic disruption of unusual objects, those having magnetic read heads, placed within the vicinity of the card reader entry/exit slot.

As illustrated in FIG. 1, the system 1 receives detection data 3 from a plurality of sensors 2. In this case the sensors 2 are provided in the form of capacitive-based sensors. The capacitive-based sensors 2 are mounted adjacent to a magnetic card reader device. The capacitive-based sensors 2 generate the detection data 3 upon a card skimmer device being placed adjacent to an exterior portion of the bezel of the ATM. For example the detection data 3 may be captured from a series of capacitive sensors 2 around the card (magstripe) reader of the ATM. The capacitive sensors 2 detect unusual objects which have magnetic read heads in the vicinity of the card reader entry/exit slot. The system 1 may include an analogue to digital converter (ADC) to receive continuous analogue signals from a transmitter-receiver electrode pair to its input channel. The system core driver may select the channel to scan. As an example the selected channel may be sampled every 180 ms and an event may be returned to the system core driver with 32-bit readings. In one embodiment the analogue to digital converter (ADC) converts the readings from selected sensors 2 into unsigned 32-bit digital values which are transmitted to the processor at a rate of 180 ms per channel.

Figure 2:
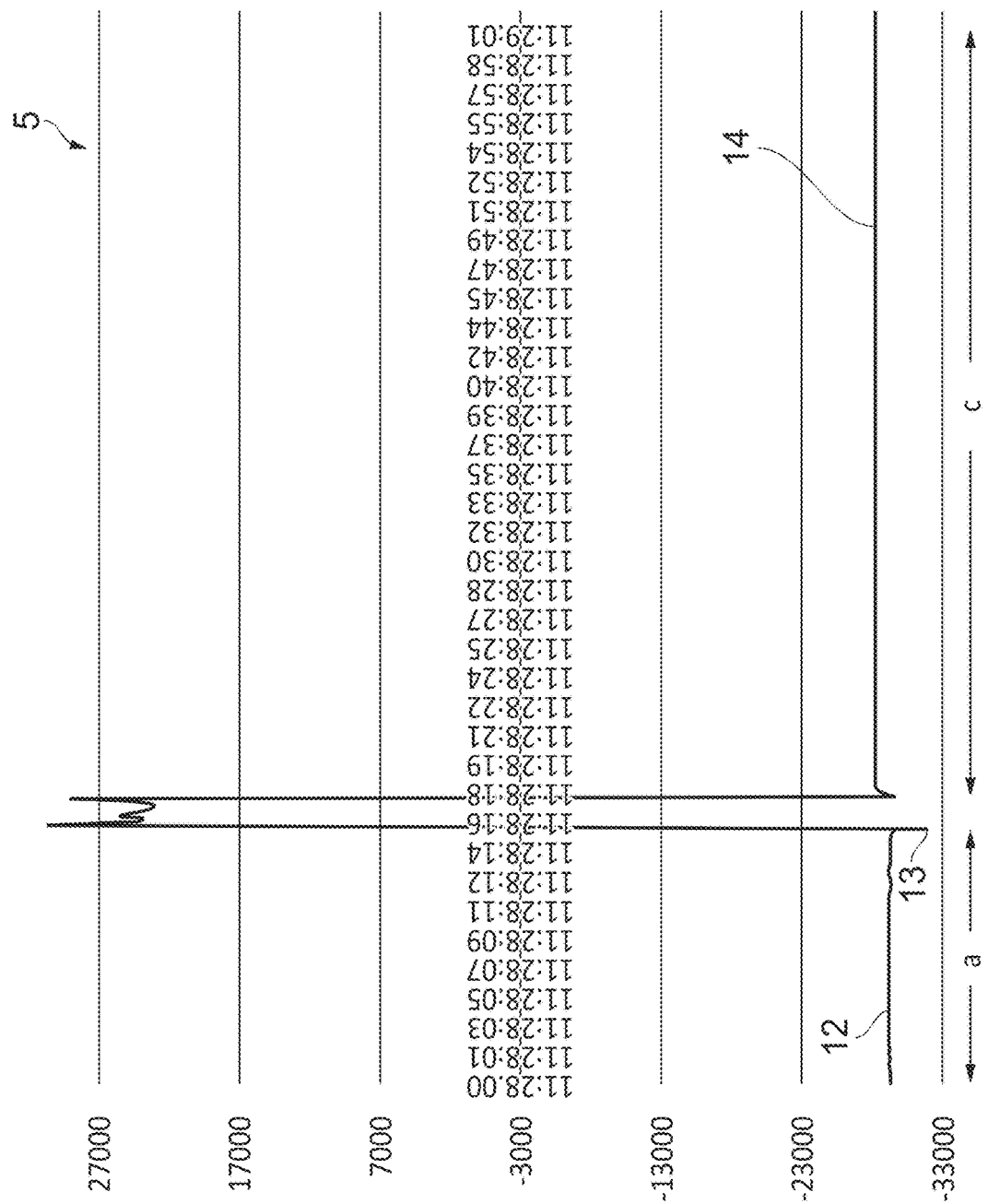
FIG. 2 is a first graph illustrating detection data of the method of FIG. 1.

The system 1 includes a second machine learning model 4. In this case the second machine learning model 4 is provided in the form of a deep learning model, such as a long short-term memory recurrent neural network model. The long short-term memory recurrent neural network model 4 determines a sequence 5 based on the detection data 3. As illustrated in FIG. 2, the sequence 5 includes (i) an idle state during a first time period 'a', (ii) a hand approach state during a second time period 'b' subsequent to the first time period 'a', and (iii) a card skimmer mounting state during a third time period 'c' subsequent to the second time period 'b'. The detection data 3 has a substantially constant amplitude at a first level 12 during the first time period 'a'. The detection data 3 has a negative peak amplitude 13 during the second time period 'b'. The negative peak 13 is substantially lower than the first level 12 (FIG. 2). The detection data 3 has a substantially constant amplitude at a third level 14 during the third time period 'c'. The third level 14 is substantially higher than the first level 12 (FIG. 2). The card skimmer mounting state indicates that the card skimmer device remains mounted to the bezel of the ATM. When the card skimmer is placed on the bezel, there is the signal spike 13 caused by the hand approach, this is then followed by the increase in signal amplitude 14 which remains for the duration that the skimmer remains on the bezel.

The system 1 generates a tamper alert signal 6 based on the sequence determination. The tamper alert signal 6 indicates that the card skimmer has been mounted to the bezel of the ATM.

By using the deep learning model 4, the card skimmer detection accuracy of the system 1 is enhanced. The system 1 collects data for the different scenarios, such as idle, skimmer mounting, hand approach, transactions, and rain. Data related to these events is classified accordingly and fed through the LSTM-RNN (Long Short-Term Memory Recurrent Neural Network) model 4 to detect the sequence 5. The model 4, which may be previously trained from historical sensor data, performs the required calculations to obtain the desired result of an indication of whether the card skimmer is ON or OFF. Of possible machine learned and neural networks, the LSTM-RNN (Long Short-Term Memory Recurrent Neural Network) model 4 is particularly suited for detecting sequential data and learning from the context of a situation. The neural network 4 detects the sequence 5 of signal spike 13 and the increase in amplitude 14 from idle state.

The LSTM-RNN model 4 may be trained to detect the sequence 5 to generate the card skimmer alert 6 and to ignore other forms of activities, such as hand approach, transactions, rain, and the like. This aids in reducing false positive card skimmer alerts caused by rain. Rain could lead to a noisy and unpredictable signal. Such a changing signal could otherwise lead to a false positive alert of a card skimmer being present when it is not. The system 1 achieves enhanced reliability, because the model 4 detects the specific sequence 5 to generate the alert 6 rather than any other kind of change in amplitude.

Figure 3A:
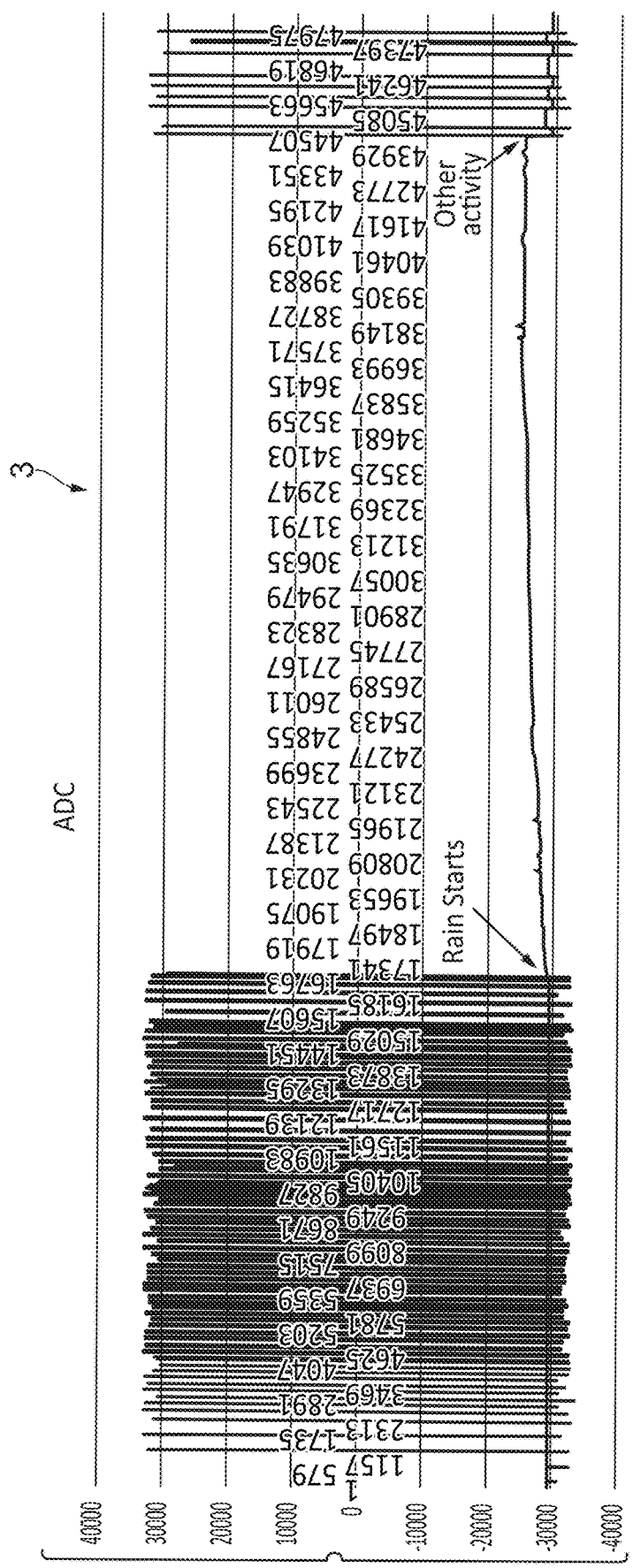
FIG. 3A is a second graph illustrating detection data of the method of FIG. 1.
Figure 3B:
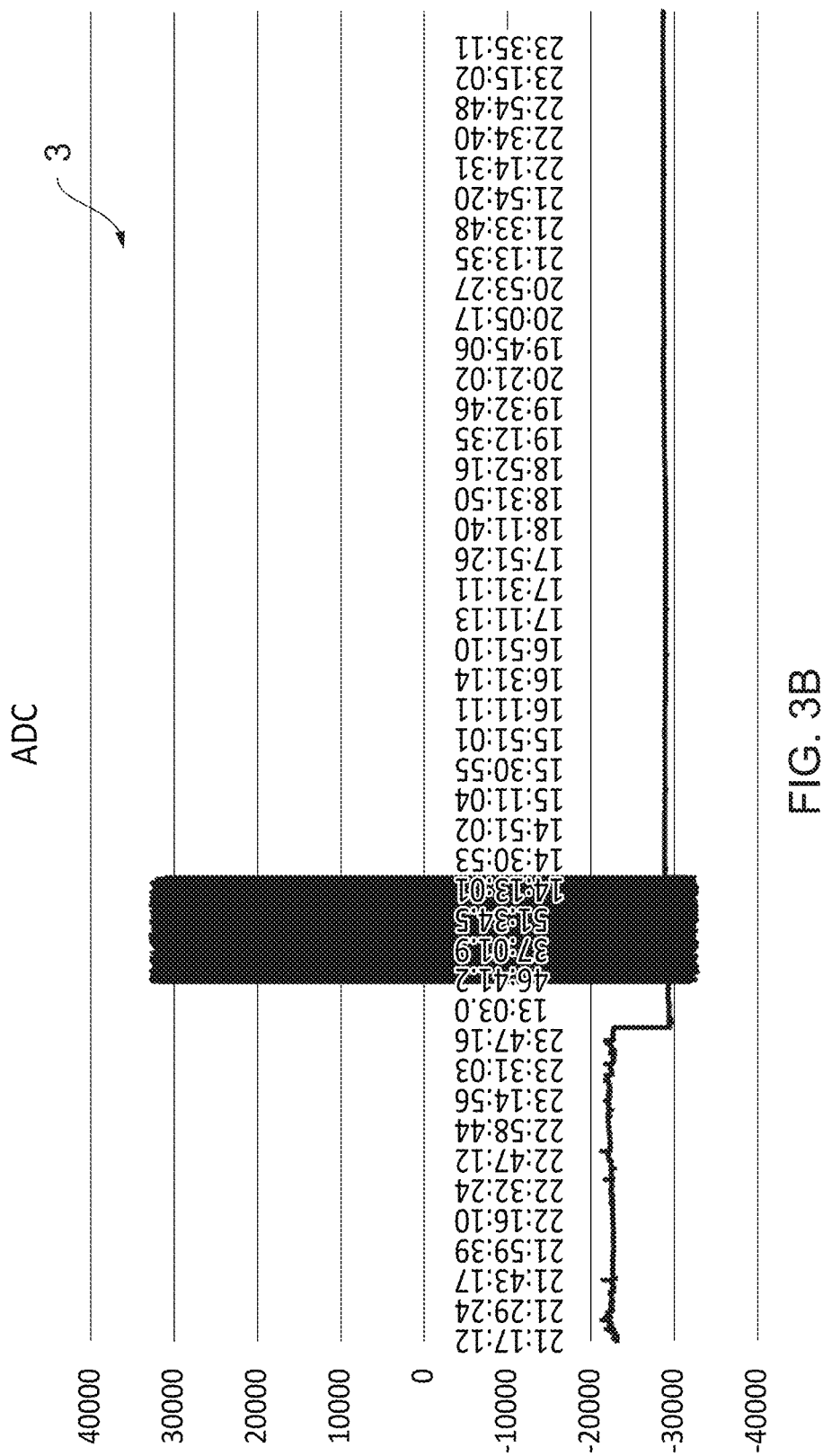
FIG. 3B is a third graph illustrating detection data of the method of FIG. 1.
Figures 4, 5:
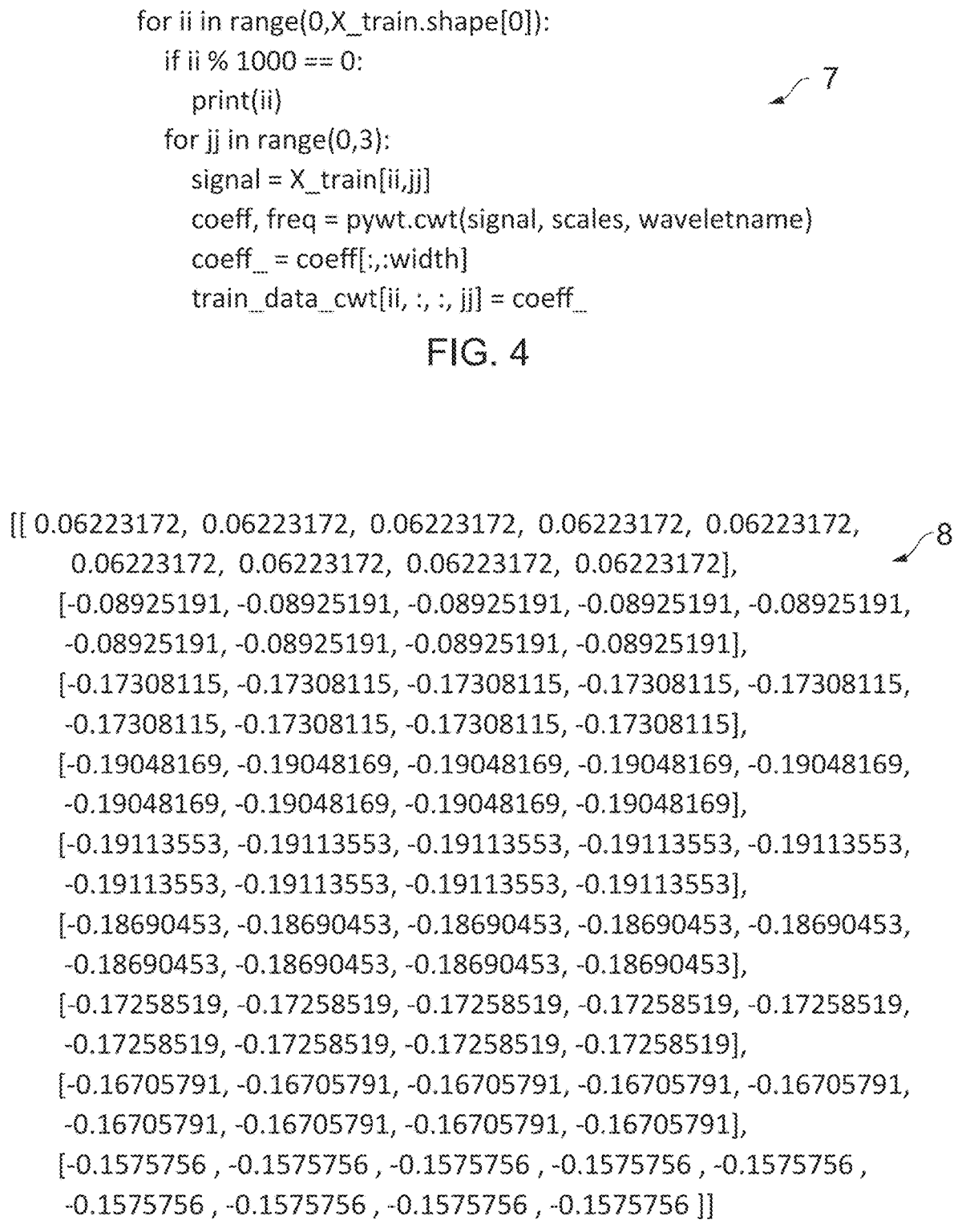

As illustrated in FIG. 1, the system 1 converts the detection data 3 from the time domain to the frequency domain using a wavelet transform 7 to generate a wavelet matrix of coefficients 8. An example of detection data 3 is illustrated in FIG. 3B. An example of a wavelet transform 7 is illustrated in FIG. 4. An example of a wavelet matrix 8 is illustrated in FIG. 5. The wavelet matrix 8 of FIG. 5 is generated using the detection data 3 of FIG. 3B and the wavelet transform 7 of FIG. 4.

Figure 8:
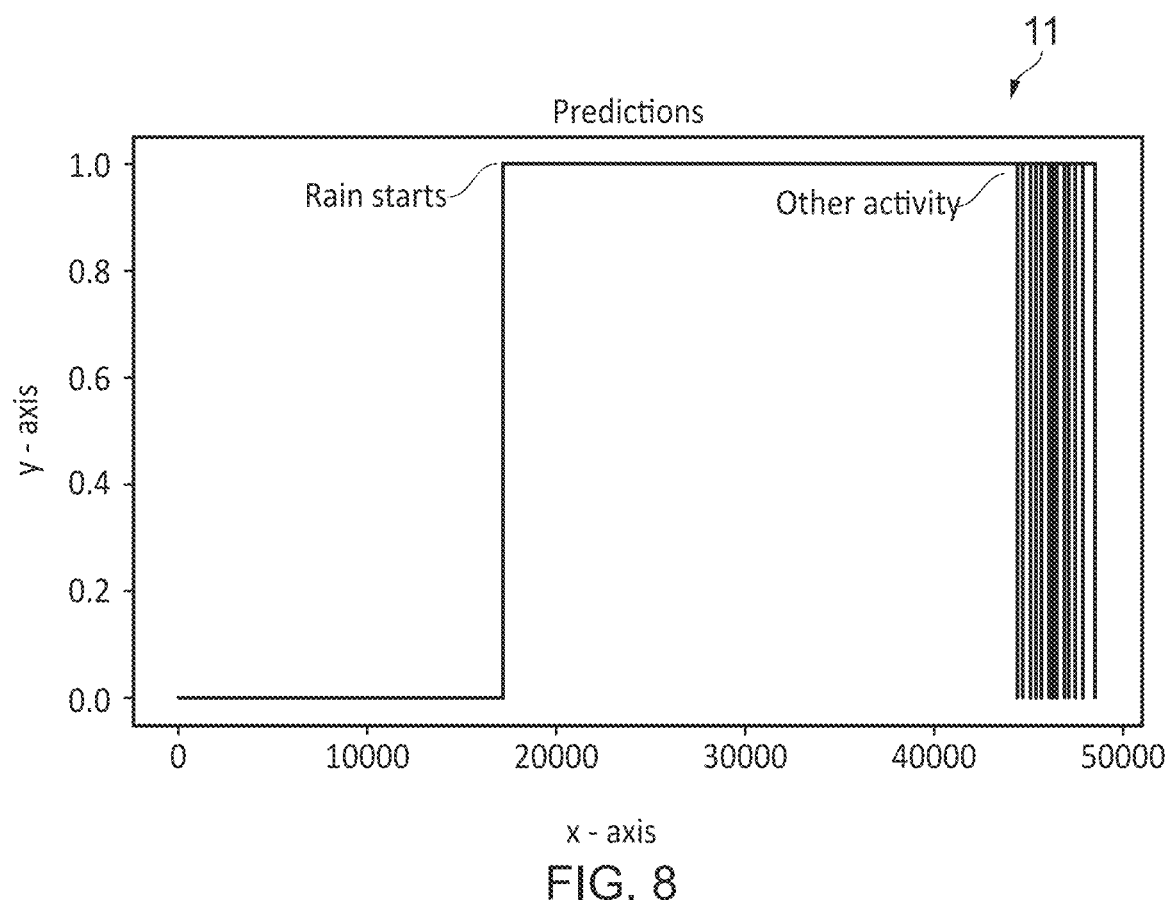
FIG. 8 is a graph illustrating an ambient environment alert of the method of FIG. 1.

The system 1 includes a first machine learning model 9. In this case the first machine learning model 9 is provided in the form of a convolutional neural network model. The convolutional neural network model 9 identifies features 10 in the wavelet matrix 8. The system 1 generates an ambient environment alert signal 11 based on the identified features 10. The ambient environment alert signal 11 may comprise an ambient weather alert signal. In this case the ambient weather alert signal comprises a rain alert signal 11 (FIG. 8).

The system 1 addresses the technical problem of rain causing the signal 3 from the capacitive sensors 2 to become noisy with a gradual build up in amplitude over time when exposed to rain. Such noise or amplitude build up could otherwise potentially lead to false positive card skimmer alerts. The detection data 3 used for the card skimmer detection is used to also run the rain detect 11 in parallel (FIG. 1).

When the system 1 is exposed to rain, the signal 3 from the sensors 2 may become noisy. Over time this may cause a gradual increase in the signal amplitude. FIG. 3A illustrates the detection data 3 with a buildup of amplitude of the signal from the sensors 2 over time due to rain. When this starts to occur, it may be difficult to distinguish between this increase caused by rain compared to an increase in amplitude caused by an actual card skimmer being mounted to the ATM. The system 1 uses the wavelet transform 7 to analyses the change in frequency without losing the localized time information of the signal 3. The wavelet transform 7 retains information on both frequency and time for enhanced signal analysis. The wavelet transform 7 is a mathematical function which divides a continuous time signal into separate scale components. The wavelet transform 7 may be discrete or continuous. In particular the wavelet matrix 8 provides a spectrum of frequencies with an indication of when these frequencies occur.

Figure 6:
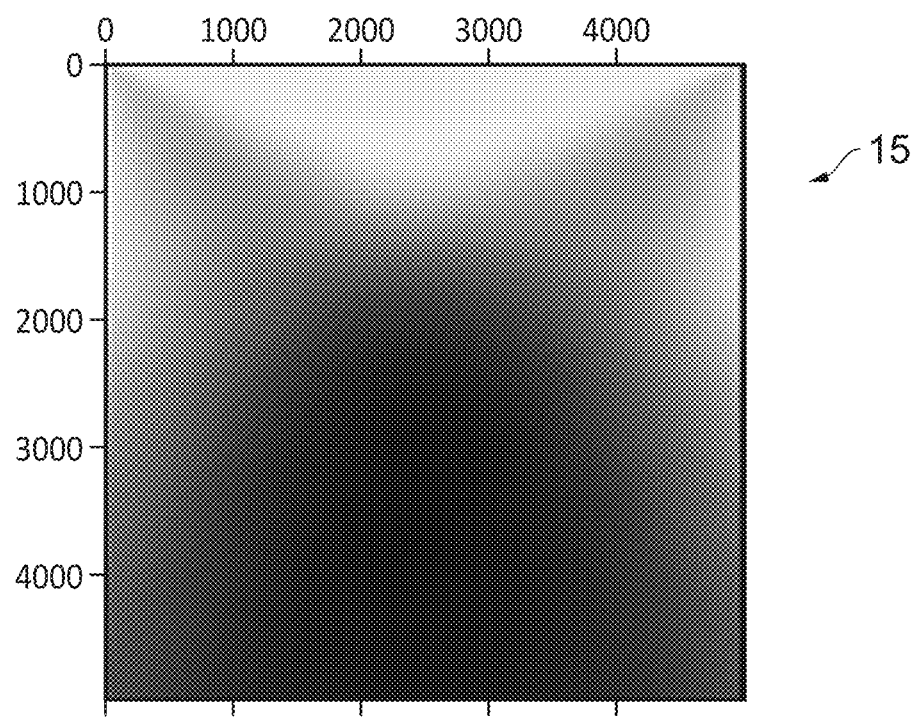
FIGS. 6 and 7 are scalogram images of the method of FIG. 1.
Figure 7:
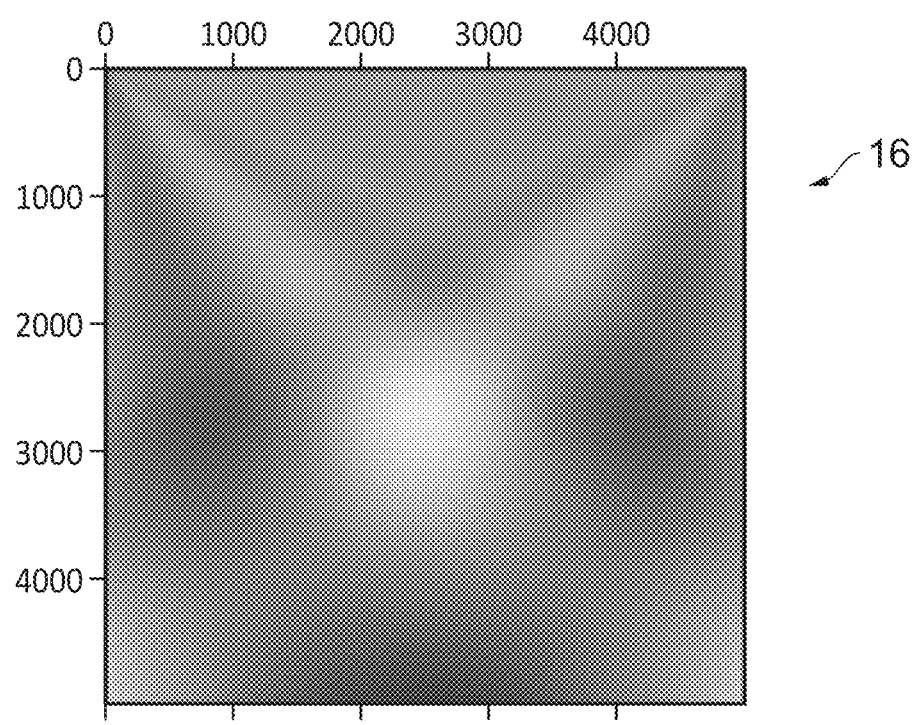

Alternatively the system 1 may generate a scalogram based on the wavelet matrix 8. An example of a scalogram 15 is illustrated in FIG. 6. An example of another type of scalogram 16 is illustrated in FIG. 7. A scalogram is a visual representation of the information in the wavelet matrix of coefficients 8. The convolutional neural network model 9 may identify the features 10 in the scalogram.

In further detail the scalogram provides a means to view information about scale components. The scalograms are graphs containing patterns which vary depending on the wavelet used. The amount of information shown in each scalogram depends on the window size used to analyses the signal data 3. An example of a scalogram image 15 produced by a Mexican hat wavelet transform is illustrated in FIG. 6. An example of a scalogram image 16 produced by a Morlet wavelet transform is illustrated in FIG. 7. The convolutional neural network 9 identifies the distinguishing features 10 in the scalogram images with a high degree of accuracy. The system 1 may thus identify when it is raining, and any false positive card skimmer alerts during rain may be removed.

In use, the system 1 receives the detection data 3 from the capacitive-based sensors 2 (FIG. 1) upon the card skimmer device being placed adjacent to the exterior portion of the bezel. Based on the detection data 3, the long short-term memory recurrent neural network model 4 determines the sequence 5 of (i) the idle state during the first time period 'a', (ii) the approach state during the second time period 'b', and (iii) the card skimmer mounting state during the third time period 'c'. The system 1 generates the tamper alert signal 6 based on the sequence determination.

In parallel the system 1 converts the detection data 3 from the time domain to the frequency domain using the wavelet transform 7 to generate the wavelet matrix 8. The convolutional neural network model 9 identifies the features 10 in the wavelet matrix 8. The system 1 generates the rain alert signal 11 based on the identified features 10.

Figure 9:
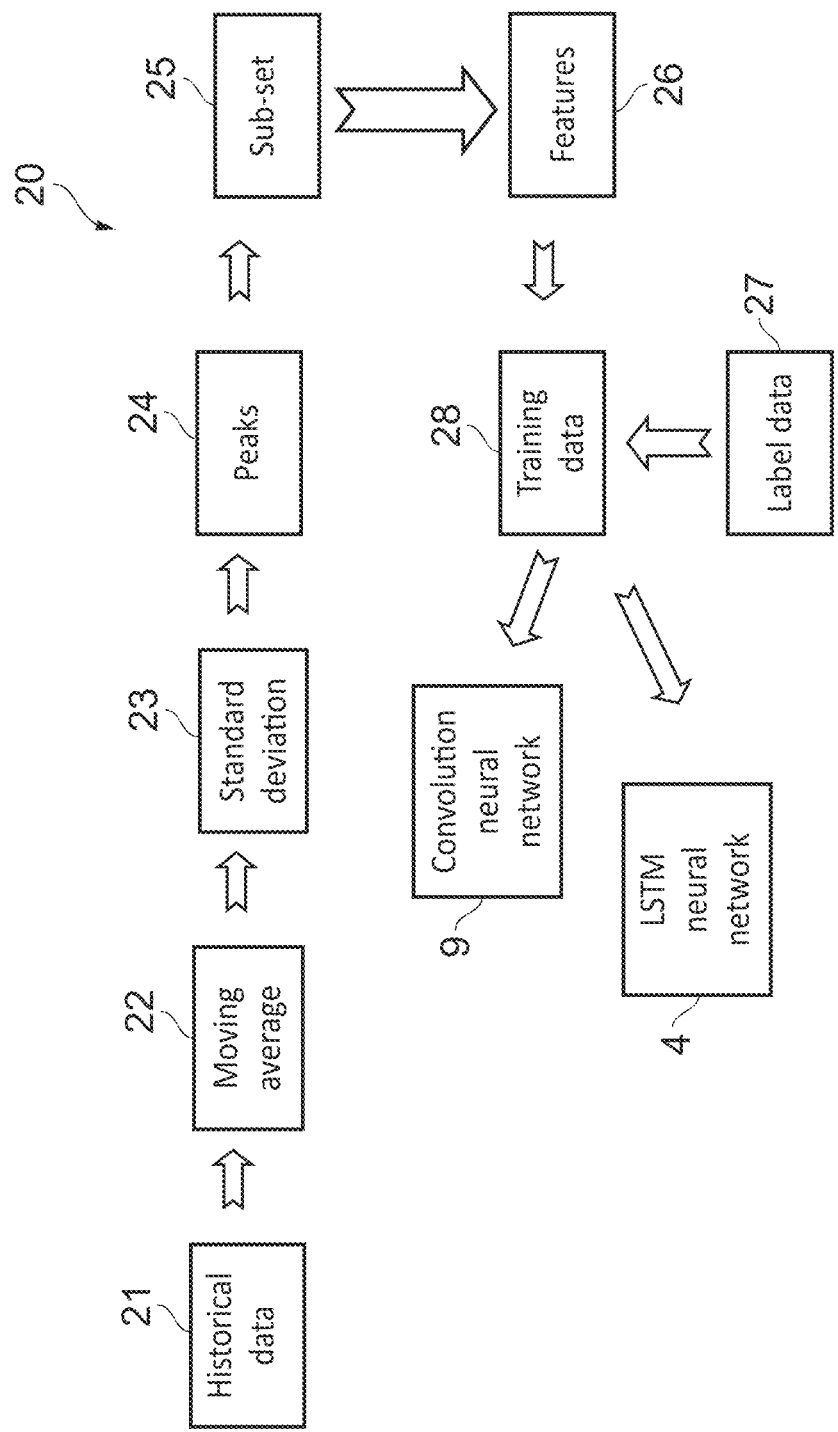
FIG. 9 is a flow diagram of a method for training machine learning models of FIG. 1.
Figure 10A:
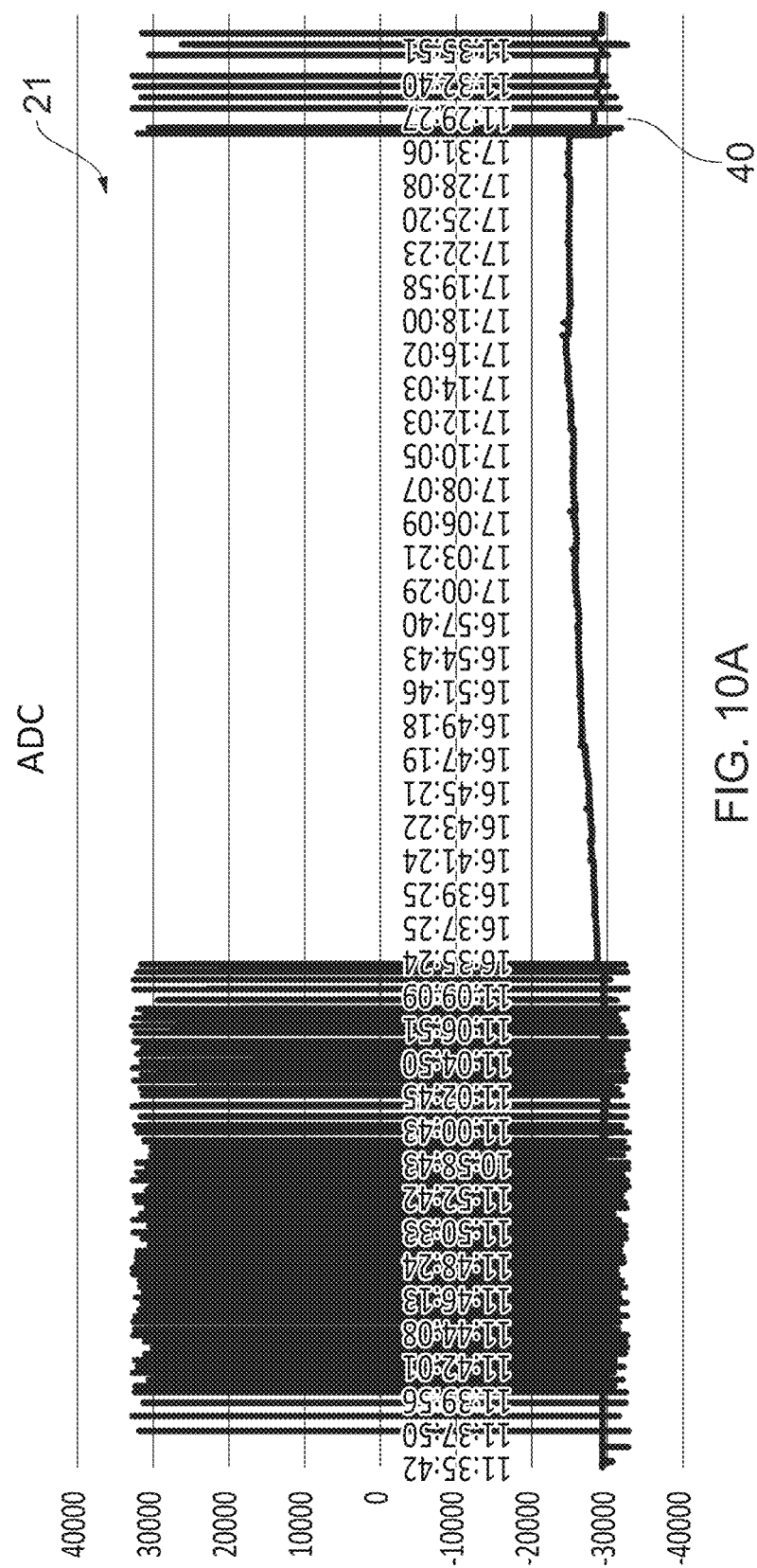
FIG. 10A is a graph illustrating historical data of the method of FIG. 9.
Figure 10B:
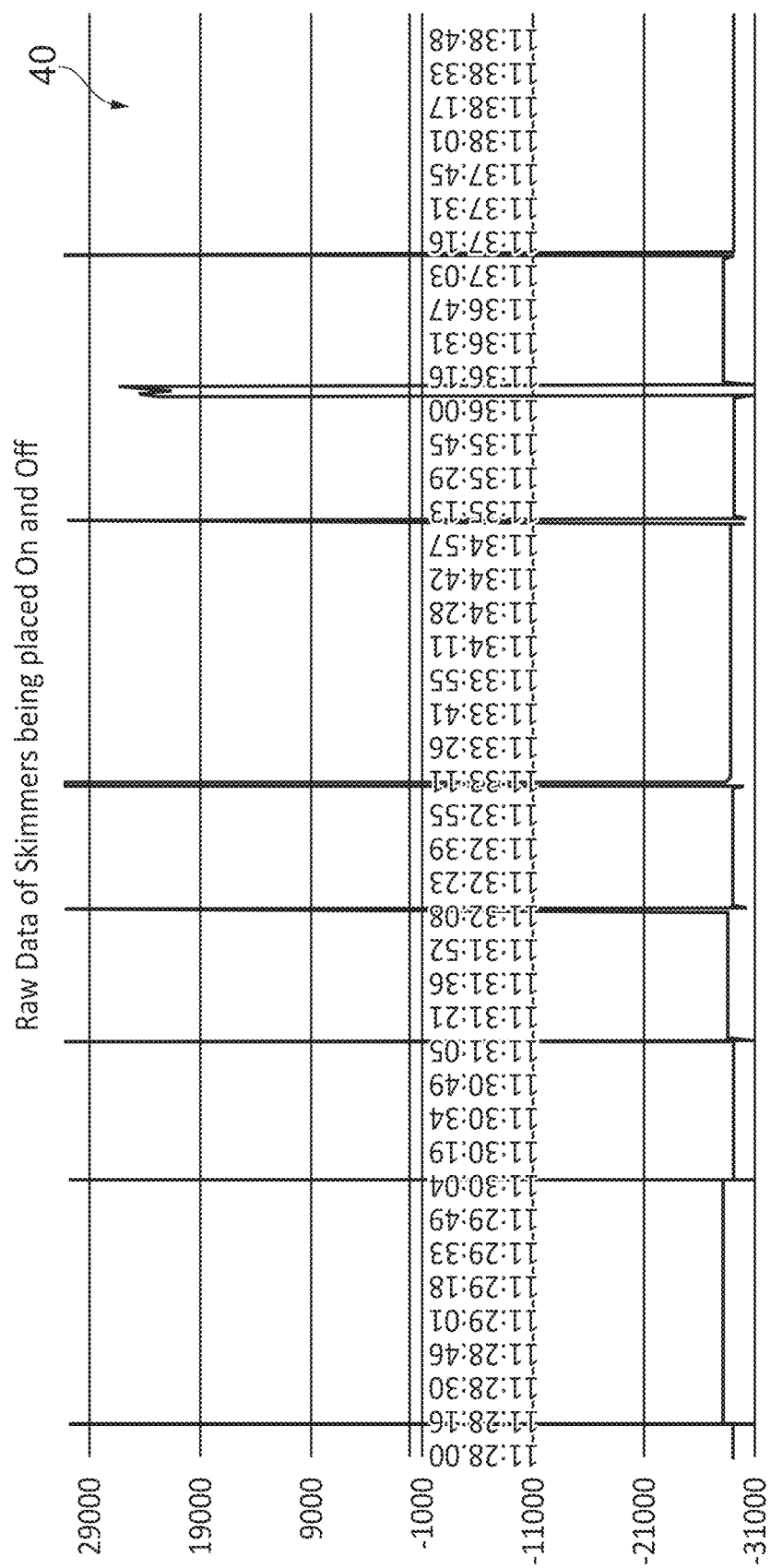
FIG. 10B is a graph illustrating part of the historical data of FIG. 10A.
Figure 10C:
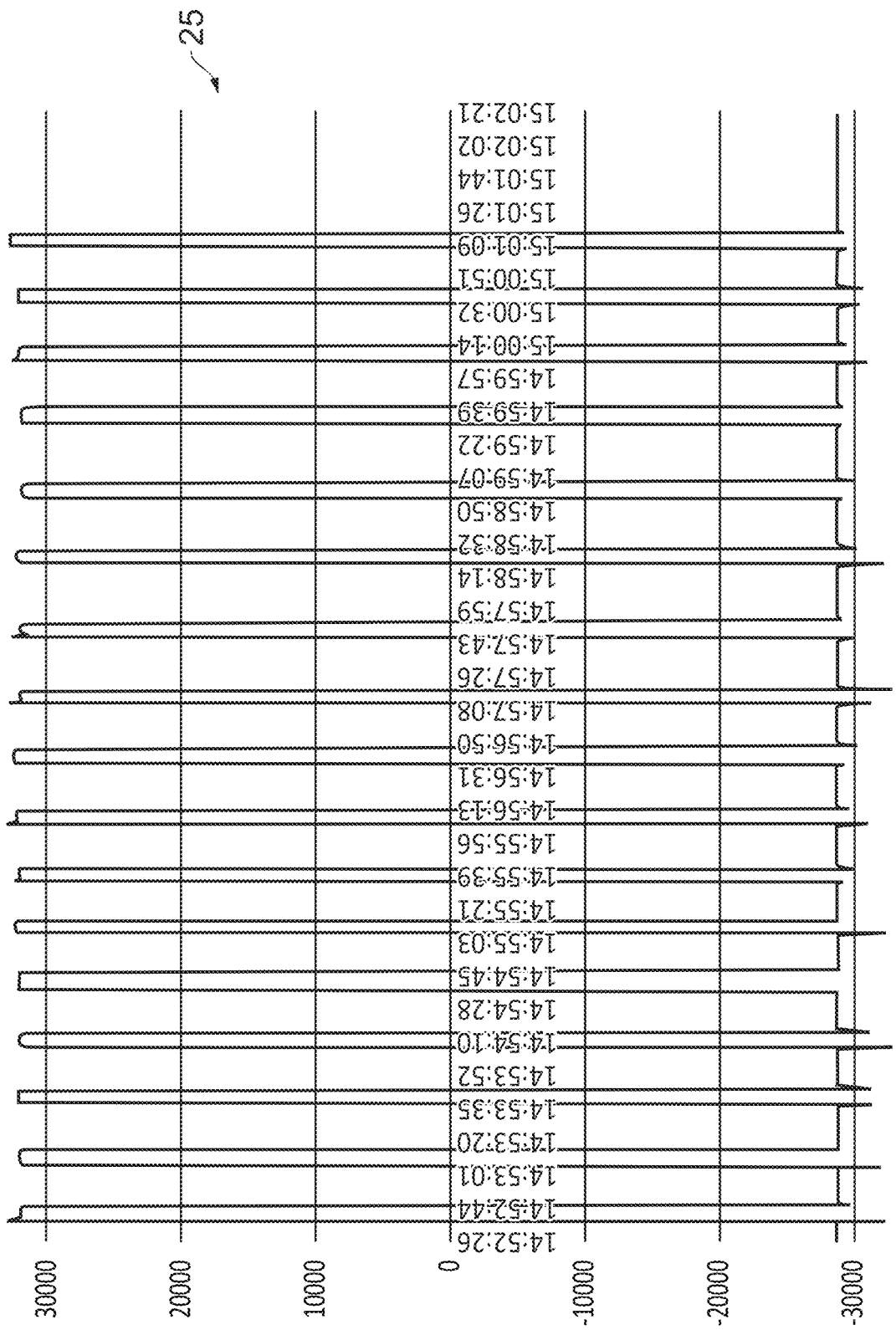
FIG. 10C is a graph illustrating sub-sets of data of the method of FIG. 9.
Figure 11:
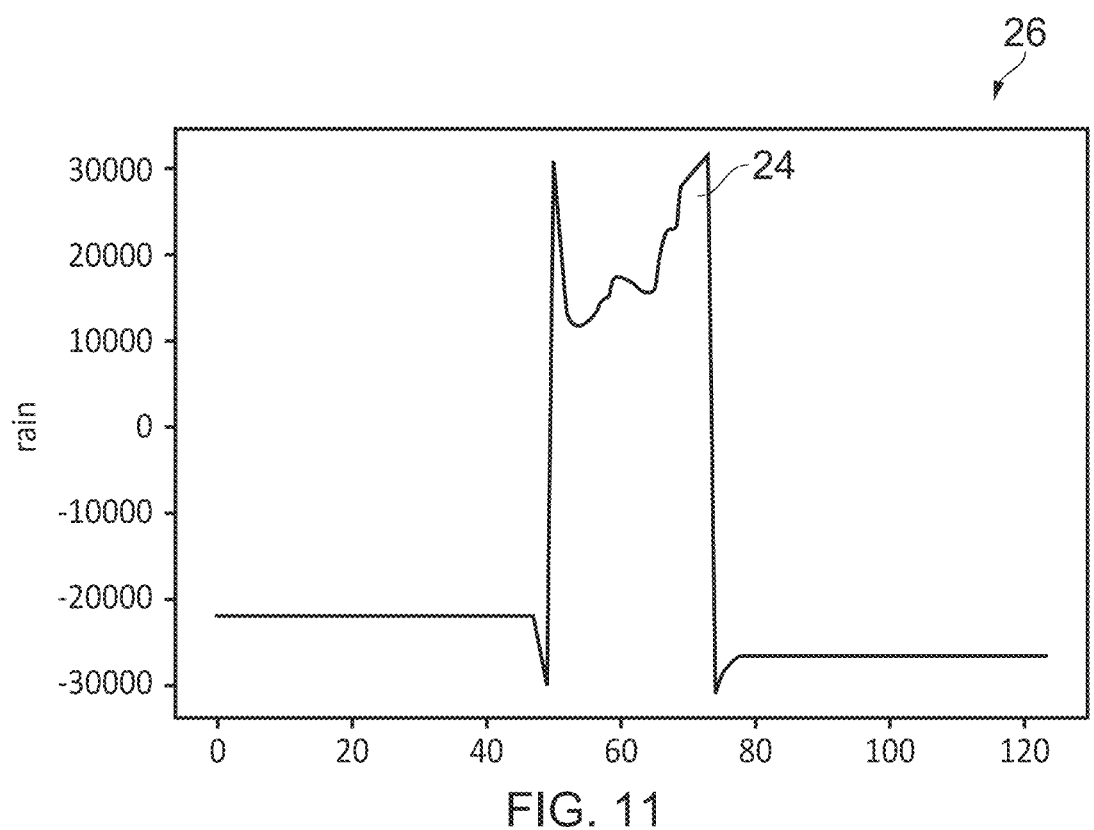
FIG. 11 is a graph illustrating a peak of the method of FIG. 9.

Referring to FIGS. 9 to 11, there is illustrated a computer-implemented data processing system 20 for training the long short-term memory recurrent neural network model 4 and the convolutional neural network model 9.

The system 20 receives a large set of historical data 21 (FIG. 10A). The historical data 21 includes previous detection data from capacitive-based sensors mounted adjacent to magnetic card reader devices. The capacitive-based sensors generated the previous detection data during normal operation of the ATMs and also upon card skimmer devices being placed adjacent to the exterior portion of bezels of the ATMs. FIG. 10B illustrates a part 40 of the historical data 21 of FIG. 10A. The part 40 represents the raw sensor data at a time period when a card skimmer is being successively mounted to the ATM and removed from the ATM.

The system 20 applies a moving average 22 and a standard deviation 23 to the set of historical data 21 based on a pre-defined threshold to identify a plurality of peaks 24 in the set of historical data 21. The system 20 generates a sub-set of data 25 based on each identified peak 24 (FIG. 10C). The sub-set of data 25 may include a pre-defined number of surrounding padding data points on either side of the identified peak 24. In this case the peak value 24 is set as '1' and the surrounding padding data points on either side of the peak 24 are set as '0'. The system 20 identifies a set of features 26 in the set of historical data 21 using the sub-sets 25 (FIG. 10D). Each of the features 26 represents an activity, such as a customer hand approaching the ATM or a card skimmer device being mounted to the ATM.

Each of the activities may be identified by different patterns of the peaks 24 in the capacitive sensor signal 21. For the card skimmer, a peak is identified due to the hand approach followed by an increase in the average amplitude of the signal by an amount varying dependent on the size of the card skimmer device. If the card skimmer is removed another peak may be identified and the signal amplitude returns to the same as at the idle state. If a peak is identified without being followed by an increase in the average amplitude of the signal from its amplitude in the idle state, it may simply be due to hand approach or other normal user activity. During a time of transaction, a multitude of peaks are identified consecutively.

The peak detection module 24 allows for signals present to be identified within the large data set 21. The system 20 reduces noise present within the data 21 by applying the moving window 22 to calculate the mean value of all data points within it. For any new data points that are a certain predefined number of standard deviations away from the moving mean, a signal is detected. Signals may be either '0' or '1', where the latter represents the identified peak 24 within the data set 21.

The signals (0' or '1') within the sub-set array 25 represent the indices within the data set 21 where the feature 26, such as a transaction, starts and ends. The feature 26 is extracted with the extra padding data from before and after the feature 26. The extracted feature 26 plotted in a graph is illustrated in FIG. 11.

Figure 12:
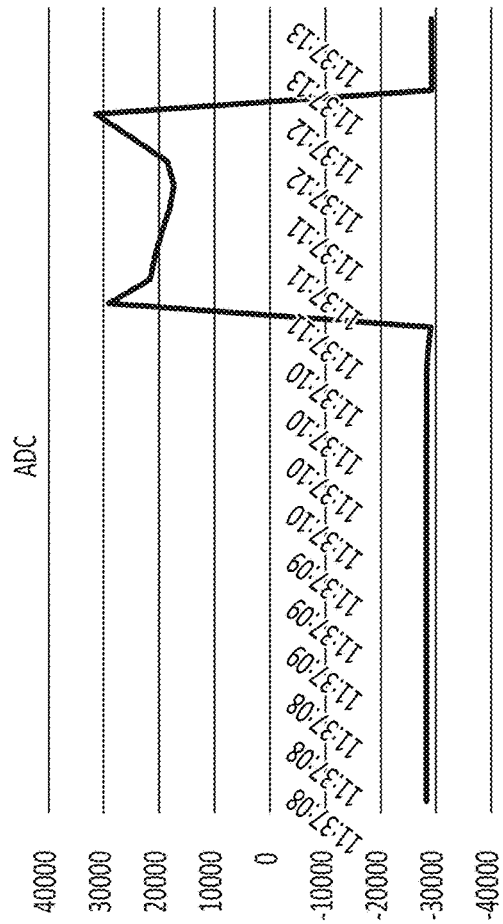
FIG. 12 is a graph illustrating label data of the method of FIG. 9.

The system 20 receives a set of user pre-defined label data 27 (FIG. 12), and the identified features 26 are augmented with the set of label data 27 to generate a set of training data 28. The set of label data 27 may include information on the category of the type of hand approach, for example a customer hand or a thief skimmer hand. The system 20 trains the long short-term memory recurrent neural network model 4 and the convolutional neural network model 9 based on the set of training data 28.

The deep learning models 4, 9 are trained using the training data 28. The process of data extraction and labelling could otherwise be highly time consuming. The system 20 speeds up this process by means of the peak detection module 24 to extract the key features 26 from the large skimmer data set 21. The system 20 identifies for example hand activity, transactions, and skimmer activity within the large data set 21. Hence the overall data pre-processing stage is faster and results in a cleaner training data set 28. Therefore the resultant card skimmer detection is more accurate.

In use, the system 20 receives the set of historical data 21 (FIG. 9). The system 20 applies the moving average 22 and the standard deviation 23 to the set of historical data 21 to identify the plurality of peaks 24 in the set of historical data 21. The system 20 generates the sub-set of data 25 based on each identified peak 24. The system 20 identifies the set of features 26 using the sub-sets 25. The system 20 receives the set of label data 27, and the identified features 26 are augmented with the set of label data 27 to generate the set of training data 28. The system 20 trains the long short-term memory recurrent neural network model 4 and the convolutional neural network model 9 based on the set of training data 28.

The embodiments of the invention described previously with reference to the accompanying drawings comprise a computer system and processes performed by the computer system. However the invention also extends to computer programs, particularly computer programs stored on or in a carrier adapted to bring the invention into practice. The program may be in the form of source code, object code, or a code intermediate source and object code, such as in partially compiled form or in any other form suitable for use in the implementation of the method according to the invention. The carrier may comprise a storage medium such as ROM, such as a CD-ROM, or magnetic recording medium, such as a floppy disk or hard disk. The carrier may be an electrical or optical signal which may be transmitted via an electrical or an optical cable or by radio or any other means.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

What is claimed is:

1. A computer-implemented method for detecting mounting of an object at a terminal device, the method comprising the steps of:
   receiving detection data from one or more sensors;
   generating a wavelet matrix based on the detection data;
   generating an ambient environment alert based on the wavelet matrix; and
   determining based on the detection data a sequence of an approach state during one predetermined time period and an object mounting state during a subsequent predetermined time period.

2. A method as claimed in claim 1 wherein the ambient environment alert comprises an ambient weather alert.

3. A method as claimed in claim 2 wherein the ambient weather alert comprises a rain alert.

4. A method as claimed in claim 1 wherein the detection data is converted from the time domain to the frequency domain using a wavelet transform to generate the wavelet matrix.

5. A method as claimed in claim 1 wherein the method comprises the step of identifying one or more features in the wavelet matrix, the ambient environment alert being generated based on the one or more identified features.

6. A method as claimed in claim 5 wherein the one or more features are identified using a first machine learning model.

7. A method as claimed in claim 6 wherein the first machine learning model comprises a convolutional neural network model.

8. A method as claimed in claim 1 wherein the terminal device comprises an automated teller machine device.

9. A method as claimed in claim 1 wherein the object comprises a card skimmer device.

10. A method as claimed in claim 1 wherein the method comprises the steps of:
    generating a set of training data; and
    training at least one of the first machine learning model and the second machine learning model based on the set of training data.

11. A computer-implemented method for detecting mounting of an object at a terminal device, the method comprising the steps of:
    receiving detection data from one or more sensors;
    generating a wavelet matrix based on the detection data;
    generating an ambient environment alert based on the wavelet matrix; and determining based on the detection data a sequence of (i) an idle state during a first time period, (ii) an approach state during a second time period, and (iii) an object mounting state during a third time period.

12. A method as claimed in claim 11 wherein the method comprises the step of generating a tamper alert based on the sequence determination.

13. A method as claimed in claim 11 wherein the detection data has a substantially constant amplitude at a first level during the first time period.

14. A method as claimed in claim 11 wherein the detection data has a negative peak amplitude during the second time period, the negative peak being substantially lower than the first level.

15. A method as claimed in claim 11 wherein the detection data has a substantially constant amplitude at a third level during the third time period, the third level being substantially higher than the first level.

16. A method as claimed in claim 11 wherein the sequence is determined using a second machine learning model.

17. A method as claimed in claim 16 wherein the second machine learning model comprises a deep learning model.

18. A method as claimed in claim 17 wherein the deep learning model comprises a long short-term memory recurrent neural network model.

19. A data processing system for detecting mounting of an object at a terminal device, the system comprising a processor configured to:
receive detection data from one or more sensors;
generate a wavelet matrix based on the detection data;
generate an ambient environment alert based on the wavelet matrix; and
determining based on the detection data a sequence of an approach state during one predetermined time period and an object mounting state during a subsequent predetermined time period.

20. A computer program product comprising instructions capable of causing a computer system to perform a method as claimed in claim 1 when the computer program product is executed on the computer system.

* * * * *